(12) United States Patent
Alvarez et al.

(10) Patent No.: US 7,801,656 B2
(45) Date of Patent: Sep. 21, 2010

(54) PROCESS FOR ASSISTING DOWNHILL DRIVING AND ASSOCIATED DEVICE

(76) Inventors: Belen Alvarez, Avenida del Talgo, 83 - No 3 H, Madrid, 28023 (ES); Xavier Marie Groult, 8 Place Clement Ader, Survilliers, 95470 (FR)

( * ) Notice: Subject to any disclaimer, the term of this patent is extended or adjusted under 35 U.S.C. 154(b) by 776 days.

(21) Appl. No.: 10/592,577

(22) PCT Filed: Apr. 4, 2005

(86) PCT No.: PCT/FR2005/000808
§ 371 (c)(1),
(2), (4) Date: Jun. 6, 2007

(87) PCT Pub. No.: WO2005/100109
PCT Pub. Date: Oct. 27, 2005

(65) Prior Publication Data
US 2008/0051968 A1    Feb. 28, 2008

(30) Foreign Application Priority Data
Apr. 5, 2004    (EP)    ................... 04290893

(51) Int. Cl.
*B60T 8/66*    (2006.01)
(52) U.S. Cl. ................ 701/70; 701/74; 701/79; 701/93; 701/96; 303/191; 303/192; 477/182
(58) Field of Classification Search ............. 701/70, 701/74, 79, 93, 96; 303/191, 192; 180/170; 477/182
See application file for complete search history.

(56) References Cited
U.S. PATENT DOCUMENTS
4,629,043 A * 12/1986 Matsuo et al. ............. 477/184

5,941,614 A * 8/1999 Gallery et al. ............. 303/192
5,997,108 A * 12/1999 Claussen et al. ........... 303/192
6,571,768 B1 * 6/2003 Nishiyama ............... 123/406.5

(Continued)

FOREIGN PATENT DOCUMENTS
EP    1101676    11/2000

(Continued)

OTHER PUBLICATIONS
European Search Report No. EP04290893 dated Aug. 8, 2004.

*Primary Examiner*—Thomas G Black
*Assistant Examiner*—Ce Li
(74) *Attorney, Agent, or Firm*—Dickinson Wright PLLC

(57) ABSTRACT

The invention relates to a driving assistance method which is intended for use on a slope. According to the invention, the vehicle comprises an accelerometer which can measure a longitudinal acceleration of the vehicle as measured longitudinal acceleration. The inventive method comprises the following steps consisting in: determining the instantaneous value of the slope (p) on which the vehicle is positioned, by calculating an instantaneous longitudinal acceleration from the measurements taken by wheel speed sensors, and, subsequently, comparing the instantaneous longitudinal acceleration with the longitudinal acceleration measured by the accelerometer; determining (156) a theoretical brake torque ($\Gamma_{th}$) as a function of the slope such that the vehicle reaches a desired speed ($V_o$); correcting (162) the theoretical brake torque value in order to obtain a target brake torque ($\Gamma$<SB>C</SB>); and emitting (163) a signal corresponding to the target brake torque in the direction of the brake regulation system.

17 Claims, 7 Drawing Sheets

U.S. PATENT DOCUMENTS

| | | | |
|---|---|---|---|
| 6,692,090 | B1 | 2/2004 | Heyn et al. |
| 6,701,224 | B1 * | 3/2004 | Klusemann .................... 701/1 |
| 2002/0041167 | A1 * | 4/2002 | Kitano et al. .................. 318/3 |
| 2005/0096183 | A1 * | 5/2005 | Watanabe et al. ........... 477/182 |

FOREIGN PATENT DOCUMENTS

| | | |
|---|---|---|
| WO | WO0114185 | 3/2001 |

* cited by examiner

PROCESS FOR ASSISTING DOWNHILL DRIVING AND ASSOCIATED DEVICE

The present invention relates to assisting driving of a vehicle. More particularly, the invention relates to a process and a device for assisting driving on descent of a slope on which the vehicle is engaged.

A driver who has stopped his vehicle on a slope can have problems pulling away again. Pulling away is an operation which is rendered more difficult to perform when the vehicle has a manual gear-box.

In a first case in point, the driver seeks to pull away in his vehicle to climb the slope. The driver must let in the clutch and accelerate in such a manner as to prevent stalling, while progressively releasing the hand-brake when this has been used. Pulling away on a slope is as difficult as the slope is steep.

In a second case, the driver seeks to pull away in his vehicle to descend the slope. The driver uses the inertia of the vehicle to descend the slope while progressively releasing the brakes. Optionally, the engine is used as a brake by judicious operation of the clutch pedal, a velocity having been exceeded.

In the particular case in which the slope is descended in reverse, i.e. when the front of the vehicle is orientated towards the top of the slope, the driver must additionally turn towards the rear to watch the road while turning the steering wheel. If the slope of the road is steep, the driver is in a position which does not allow him to see the road to be followed. This situation often occurs when an all-terrain vehicle is driven on a slope having a steep gradient.

The document U.S. Pat. No. 5,941,614 describes a function for assistance of downhill driving whatever the orientation of the vehicle on the slope and whether the vehicle is initially stationary or has a certain velocity. In this document, the assistance function is activated by the driver by pressing a button. The vehicle includes wheel velocity sensors permitting calculation of the instantaneous velocity of the vehicle. Moreover the braking system is an entirely hydraulic system coupled to the brake pedal operated by the driver.

When the assistance function is called, provided the gearbox is in first gear or reverse, a braking force is applied so as to adjust the instantaneous velocity of the vehicle for it to reach a threshold velocity of the order of 10 kmh$^{-1}$. More precisely, the braking torque required by the assistance function is a function of the difference between the instantaneous velocity of the vehicle and the threshold velocity.

In this document, the use of an accelerometer is envisaged, in conjunction with the instantaneous acceleration calculated from the instantaneous velocity, to determine the angle of the slope. This information allows the value of the threshold velocity to be changed.

The system described is complex, as it includes a set of valves and hydraulic circuits for governing the pressure from which the braking torque originates.

Moreover, in accordance with this method, the vehicle is left to pick up velocity along the slope before application of a braking torque able to coincide the instantaneous velocity with the threshold velocity. Consequently, the instantaneous velocity can exceed the threshold velocity before being reduced to then pass below the value of the threshold velocity. These velocity oscillations are felt by the driver. Apart from the discomfort, the driver has the impression that the vehicle is being driven along the slope with too great a velocity and tends to press on the brake pedal. This has the consequence of exiting the assistance function.

The document WO 01/14185 A1 proposes to improve the function of the preceding document by adding a supplementary torque, dependent on the slope, to the basic torque determined as in the preceding document, if certain conditions are verified. If the vehicle is initially stationary and the conditions are verified, the basic torque is small to allow the vehicle to attain velocity, as, at this instant, the measured instantaneous velocity is distinctly below the threshold velocity. Moreover, the supplementary torque which [is] determined as a function of a pressure before the increase in the current pressure is undefined at the initial instant. Thus, the problem of the velocity oscillations is not satisfactorily resolved for an initially stationary vehicle.

In recent vehicles, it is possible to take over the braking system from the driver by applying a braking torque to the wheels without the intervention of the driver. Operation of the brake pedal by the driver is uncoupled from the effective application of a braking torque to one of the wheels of the vehicle. These braking systems include either hydraulic calipers or electromechanical calipers, or again hydraulic calipers at the front and electromechanical calipers at the rear (hybrid braking system).

The invention has the aim of proposing a process for assisting driving in the descent of a slope not having at least certain of the disadvantages mentioned above.

The invention has as its object an improved process and device for assisting driving of a vehicle engaged on a slope, the said vehicle including:

- a braking system uncoupled from the operation of a brake pedal by the driver of the vehicle and able to apply a braking torque to at least one wheel of the said vehicle;
- at least one wheel velocity sensor able to measure an instantaneous velocity of a wheel of the said vehicle;

the process including the steps consisting of:

- determining the instantaneous value of the slope on which the vehicle is located;
- testing the simultaneous initial existence of initial conditions including at least one entry condition; and, once the said initial conditions have all been verified and while at least one exit condition is not verified, performing successive iterations of a main loop for determination of a target braking torque consisting of:
  - defining a desirable velocity having to be attained by the vehicle;
  - determining the said target braking torque as a function of a difference between the instantaneous value of the said desirable velocity and the instantaneous value of a calculated velocity, calculated from measurements performed by the said at least one wheel sensor; and,
  - transmitting a signal corresponding to the value of the said target braking torque to a braking control system forming part of the braking system;

characterised by the fact that the said initial conditions include an entry condition verified when the vehicle is stationary and by the fact that from the moment at which the said initial conditions are all verified and until an exit condition from the initial procedure is verified, the said target braking torque is determined by an initial procedure of progressive release of the brakes comprising the step consisting of temporally reducing the said target braking torque from an initial stationary value, the said exit condition from the initial procedure depending on a comparison between the said target braking torque and a theoretical braking torque which is a function of the value of the slope.

Preferably, the said initial procedure comprises the steps consisting of:

reducing the said target braking torque until the said calculated velocity is greater than a predetermined threshold velocity, increasing the said target braking torque until the said exit condition from the initial procedure is verified, the said exit condition from the initial procedure being verified when the said target braking torque is greater than the said theoretical braking torque.

Due to these characteristics, it is ensured that the vehicle starts to be displaced during the initial procedure under the influence of its weight. As the release is progressive, this setting in motion is progressive. So that this setting in motion remains well controlled, the velocity threshold is preferably set very low, i.e. at the level [at the level] of the said desirable velocity or below. In accordance with a particular embodiment, the velocity threshold is a detection threshold intended to detect the first displacement of the vehicle. To this end, the velocity threshold is located just above the margin of error of the wheel velocity sensors.

Advantageously, the said theoretical braking torque is substantially equal to the torque to be applied to the said at least one wheel of the vehicle to keep the velocity of the vehicle constant.

This value is necessarily greater than the braking torque value which allows the vehicle to set itself in motion from being totally stationary. To ensure a gentle transition between the initial release procedure and the main loop, the theoretical braking torque is preferably so adjusted as to just keep the vehicle at constant velocity on the slope in question, i.e. to compensate for the acceleration due to the weight of the vehicle without sharply re-immobilising it. Thus, it is ensured that the vehicle is not subject to high acceleration during the above-mentioned transition. The main loop is preferably so executed as to also avoid high accelerations. To this end, the determination of the target braking torque at an iteration preferably takes into account the value of the target braking torque at the preceding iteration.

In accordance with a particular embodiment, the step of reduction of the target braking torque is firstly performed at a first rate of temporal variation until the said target braking torque is less than the said theoretical braking torque, and then at a second rate of temporal variation until the said calculated velocity is greater than a predetermined velocity threshold, the said first rate of temporal variation being greater than the said second rate of temporal variation.

Due to these characteristics, the setting in motion of the vehicle is still better controlled, in particular in the case in which the slope is very steep. In other words, rapid adoption of velocity is prevented.

Preferably, the step of increasing the target braking torque is performed at a third rate of temporal variation.

In accordance with a particular embodiment, when the said initial conditions are all verified, the process includes the said initial procedure of progressive release of the brakes performed in parallel with the said main loop, the said exit condition from the initial procedure being verified when the target braking torque determined by the said main loop is greater than the target braking torque determined by the said initial procedure.

The invention also has as its object a process for assisting driving of a vehicle engaged on a slope, the vehicle including a braking system uncoupled from the operation of a brake pedal by the driver of the vehicle and able to apply a braking torque to at least one wheel of the said vehicle; at least one wheel velocity sensor able to measure an instantaneous velocity of a wheel of the vehicle; an accelerometer able to measure a longitudinal acceleration of the vehicle body as measured longitudinal acceleration, characterised by the fact that it includes the steps consisting of:

determining the instantaneous value of the slope on which the vehicle is located by calculating an instantaneous longitudinal acceleration from wheel velocity measurements taken by the at least one wheel velocity sensor; determining a slope by comparison of the instantaneous longitudinal acceleration with the longitudinal acceleration measured by the accelerometer; and testing the simultaneous initial existence of initial conditions including at least one entry condition; and, once the said initial conditions have all been verified and while at least one exit condition is not verified, performing successive iterations of a main loop for determination of a target braking torque consisting of determining a theoretical braking torque as a function of the instantaneous value of the slope for the vehicle to attain a desirable velocity; correcting the value of the theoretical braking torque to obtain a target braking torque; and transmitting a signal corresponding to the value of the target braking torque to a braking control system forming part of the braking system.

Preferably, the process includes a step consisting, at each iteration of the main loop, of determining the desirable descent velocity as a function of the determined instantaneous value of the slope.

Preferably, the vehicle includes an accelerator pedal and an acceleration sensor able to measure the degree to which the accelerator pedal has been depressed by the driver and, at each iteration, the desirable velocity is determined as a function of the instantaneous value of the degree of depression of the pedal, provided that the instantaneous value of the degree of depression of the accelerator pedal is within a range limited at its lower end by a first predetermined degree of depression of the accelerator pedal and at its upper end by a second predetermined degree of depression of the accelerator pedal.

Advantageously, at each iteration, the said desirable velocity is increased by a predetermined value relative to the desirable velocity determined at the preceding iteration, provided that the said instantaneous value of the degree of depression of the accelerator pedal is within the said range.

In accordance with a particular embodiment, the said vehicle includes a clutch pedal and a sensor of displacement of the clutch pedal, and the said step consisting of determining the said desirable velocity comprises the step which consists of adding a determined value when the said sensor of displacement of the clutch pedal indicates that the said clutch pedal has been released.

Due to these characteristics, the driver can easily control the velocity at which the vehicle descends the slope.

Preferably, the theoretical braking torque is determined from a calibration table giving the value of the braking torque as a function of the determined slope.

Again preferably, the calibration table is a calibration table selected from a plurality of calibration tables indexed by a velocity value, the plurality of tables being stored in the memory space, and the calibration table selected is that of which the index corresponds to the said desirable velocity.

Preferably, an entry condition consists of comparing an instantaneous value of a velocity of the vehicle, calculated from measurements taken by the at least one wheel sensor, with a predetermined lower threshold velocity, the entry condition being verified when the instantaneous value of the velocity is less than the lower threshold velocity.

Preferably, when the initial conditions, including at least the comparison of the instantaneous velocity of the vehicle with the lower threshold velocity, are all verified, the process includes an initial procedure of progressive release of the brakes performed in parallel with the main loop, the execution of the initial procedure being stopped when the target braking torque determined by the main loop is greater than the torque required by the initial procedure.

Preferably, an entry condition consists of comparing an instantaneous value of the slope with a first predetermined threshold slope, the entry condition being verified when the instantaneous value of the slope is greater than the first threshold slope.

Preferably, the vehicle has a manual gear-box and a sensor able to detect a current position of the gear lever, and an entry condition consists of testing the instantaneous value of the position of the gear lever, the entry condition being verified when the instantaneous value of the position of the gear lever corresponds to reverse gear.

Preferably, the vehicle includes an accelerator pedal and an acceleration sensor able to measure the degree of depression of the accelerator pedal and an entry condition consists of comparing the instantaneous value of the degree of depression of the accelerator pedal with a first predetermined degree of depression, the entry condition being verified when the initial value of the said degree of depression is lower than the said first degree of depression.

Preferably, an exit condition consists of comparing an instantaneous value of the slope with a second predetermined slope, the exit condition being verified when the instantaneous value of the slope is less than the second predetermined slope.

Preferably, an exit condition consists of comparing an instantaneous velocity calculated from measurements performed by the at least one wheel velocity sensor, with an upper threshold velocity, the exit condition being verified when the instantaneous velocity is greater than an upper threshold velocity.

Preferably, the exit condition consists of comparing a required braking torque, calculated from the degree of depression of a brake pedal, with the target braking torque, the exit condition being verified when the required braking torque is greater than the said target braking torque.

Preferably, the correction of the value of the theoretical braking torque to obtain a target braking torque is a function of a difference between the instantaneous value of the desirable velocity and the calculated instantaneous velocity value.

Preferably, the correction consists of subtracting a correction braking torque from the theoretical braking torque.

In accordance with a particular embodiment, the said vehicle includes an accelerometer able to measure a longitudinal acceleration of the body of the said vehicle as the measured longitudinal acceleration, the said instantaneous value of the slope being determined by:
- calculating an instantaneous longitudinal acceleration from wheel velocity measurements performed by the said at least one wheel velocity sensor;
- determining a slope by comparison of the said instantaneous longitudinal acceleration with the said longitudinal acceleration measured by the said accelerometer.

The invention also has as its object a programmable calculator unit including a processor and at least a memory space, the memory space includes instruction codes of a program for assisting driving of a vehicle engaged on a slope, characterised by the fact that the said program for assisting driving implements the process for assisting driving described above.

The invention also has as its object a device for assisting driving of a vehicle engaged on a slope, including a braking system uncoupled from the operation by the driver of a brake pedal; at least one wheel velocity sensor able to measure the instantaneous velocity of a wheel of the vehicle; an accelerometer able to measure a longitudinal acceleration of the vehicle body as the measured longitudinal acceleration and a programmable calculator unit; the device being characterised by the fact that the programmable calculator unit is as described above.

The invention also has as its object a vehicle characterised by the fact that it includes a device for assisting driving such as described above.

The invention will be better understood and other aims, details, characteristics and advantages of it will become more clearly apparent in the course of the following description of several particular embodiments of the invention given solely in illustrative and non-limiting manner, with reference to the attached drawings. In these drawings.

Figure 1:
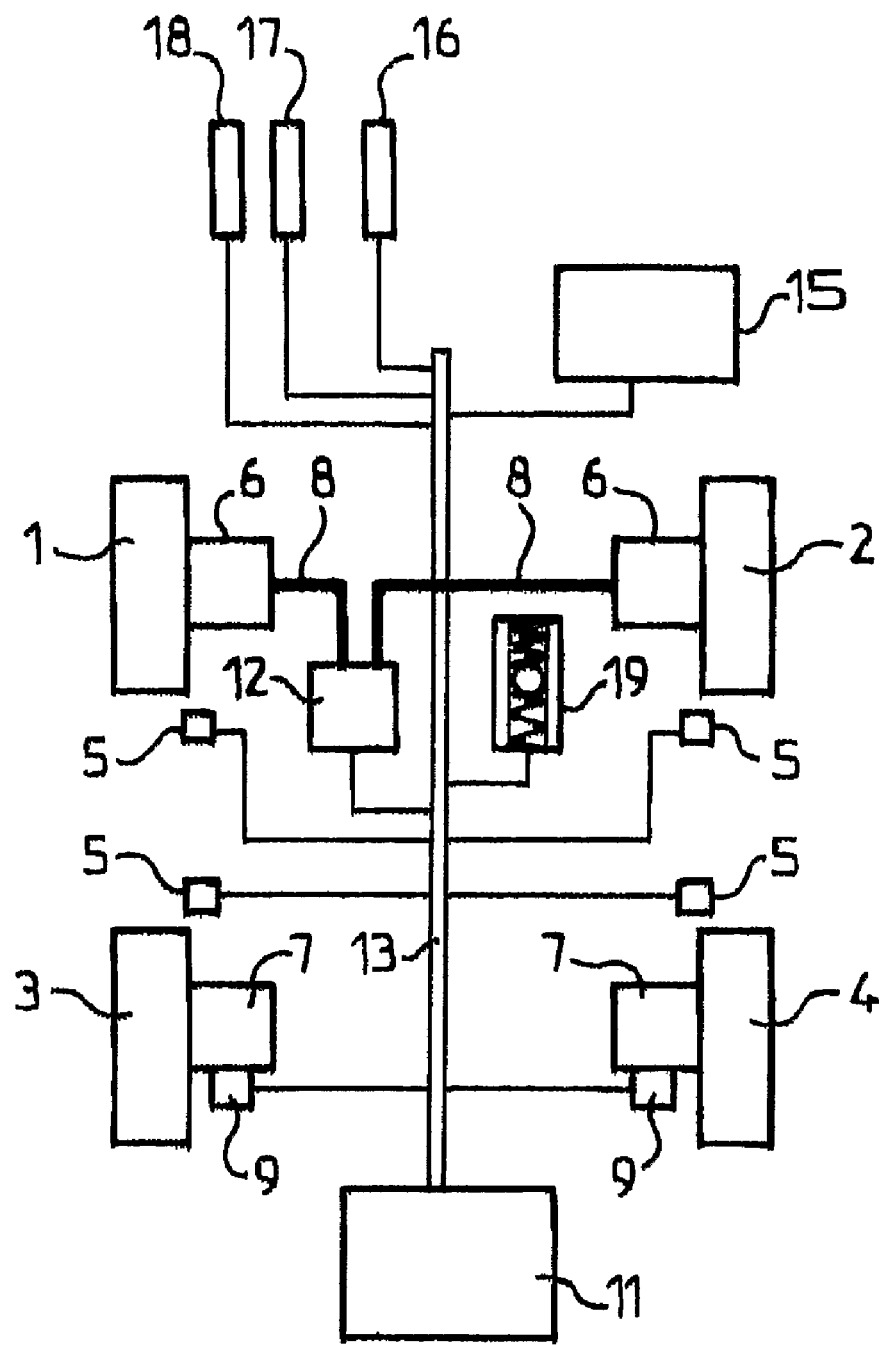
FIG. 1 is a diagrammatic representation of the device, on board a vehicle, implementing the process for assisting driving in accordance with the invention.
Figure 3A:
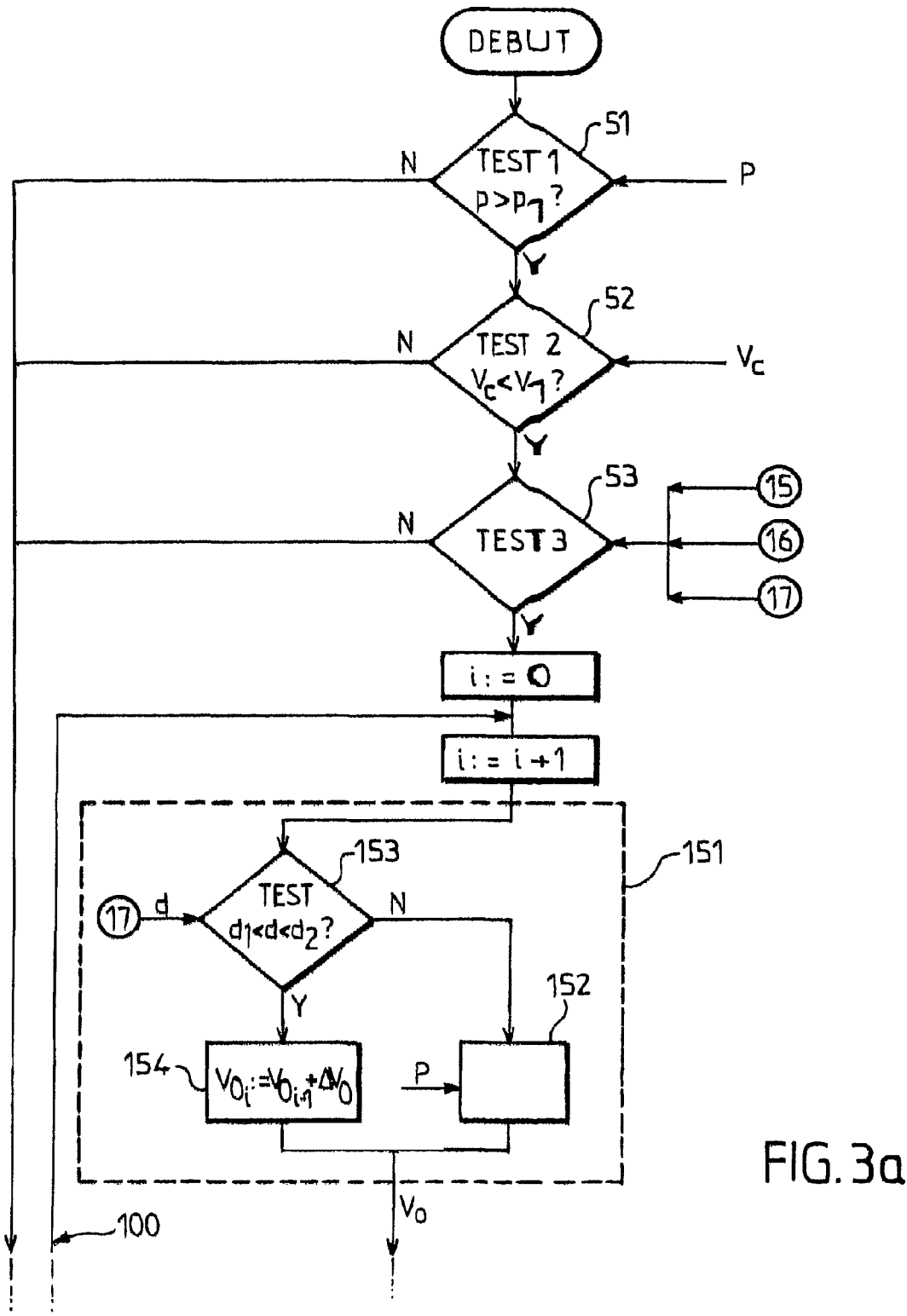
Figure 3B:
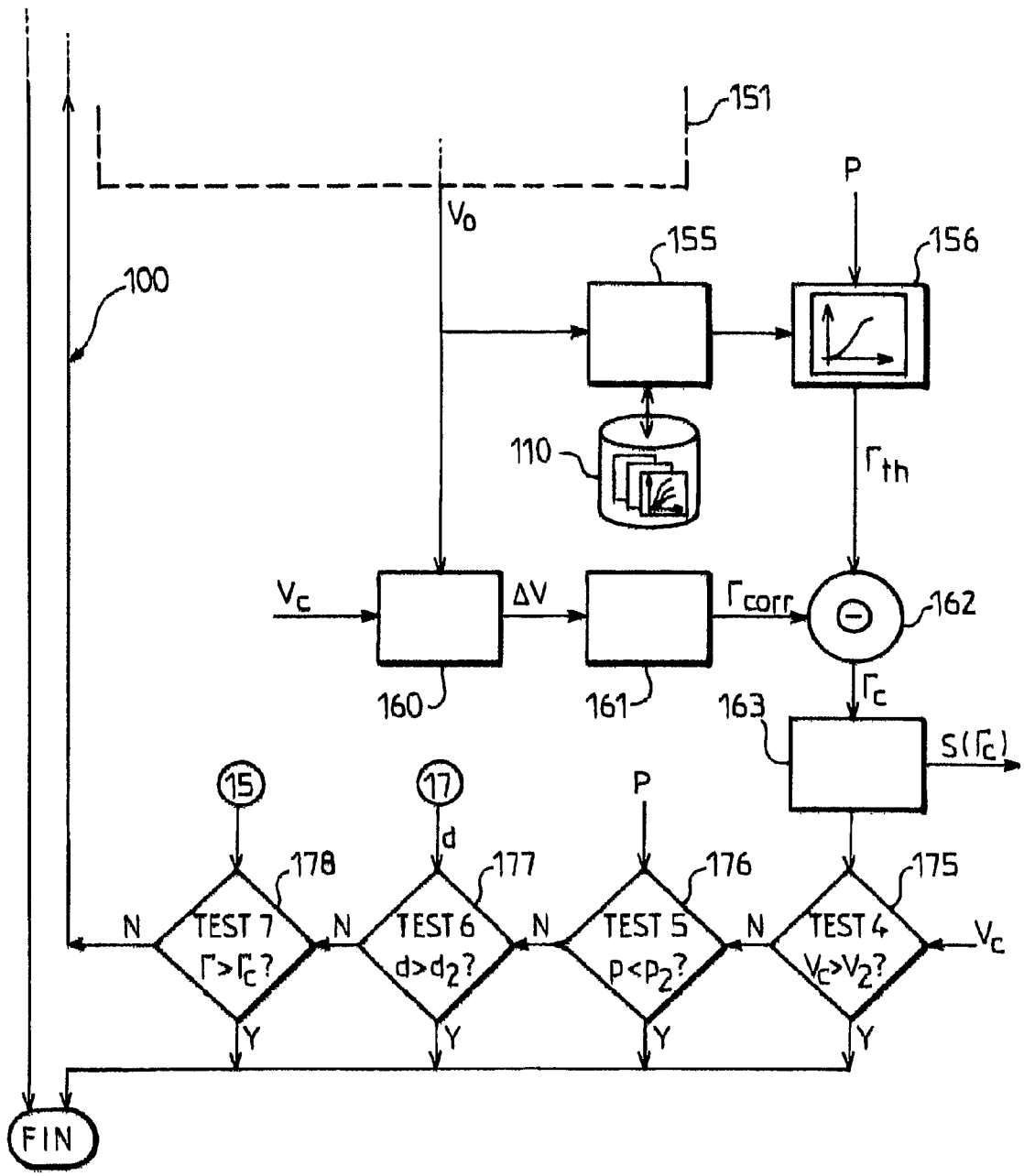
Figure 4:
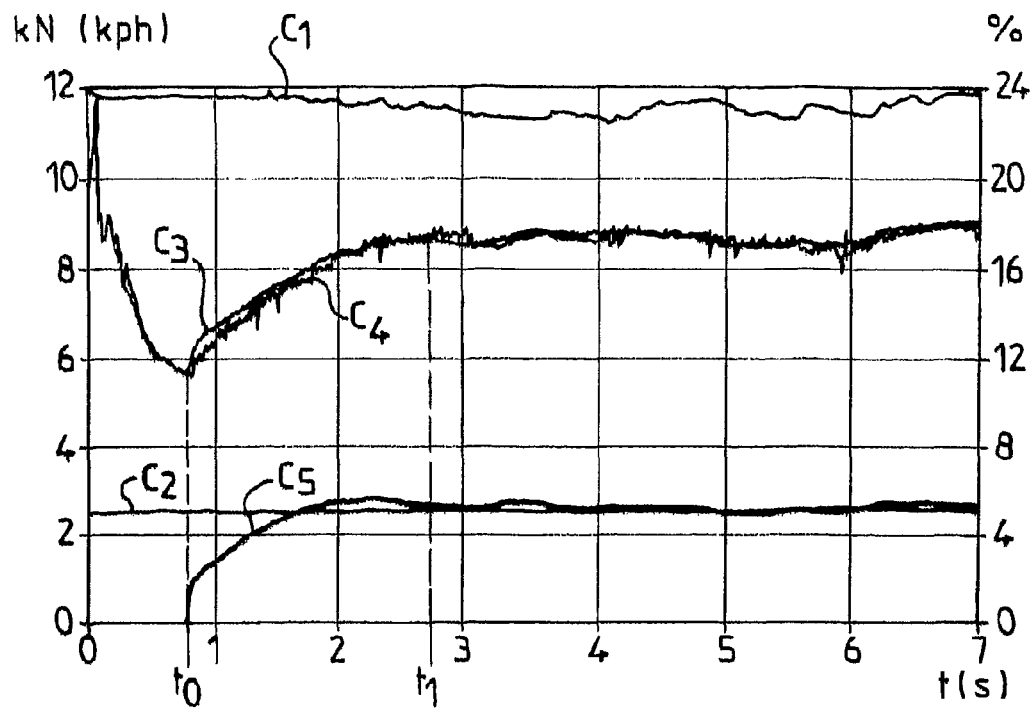
Figure 5:
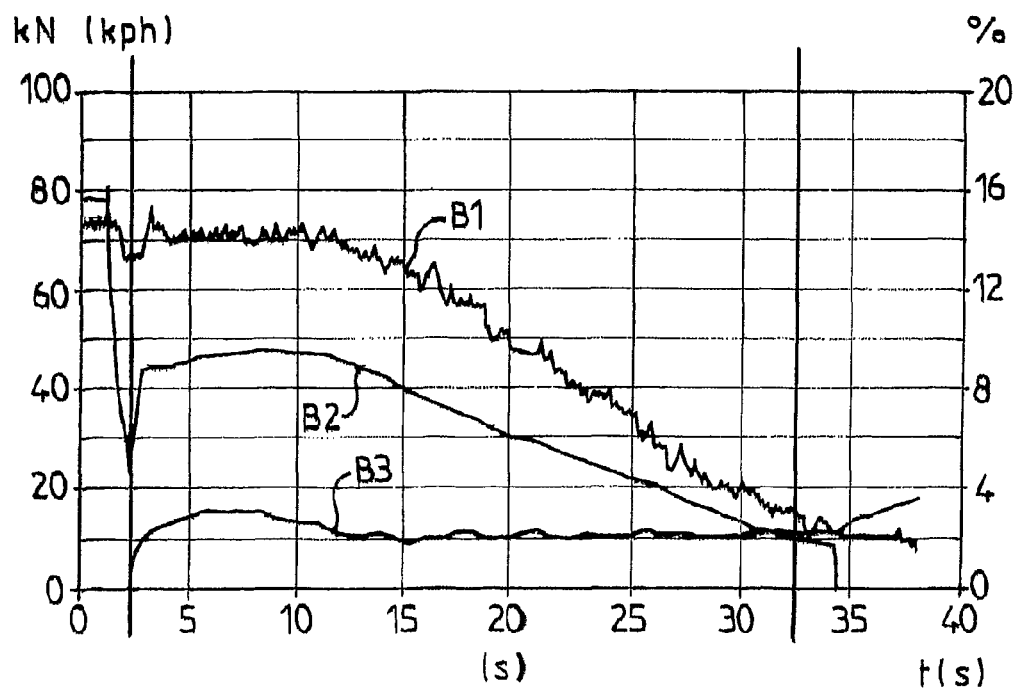
Figure 6A:
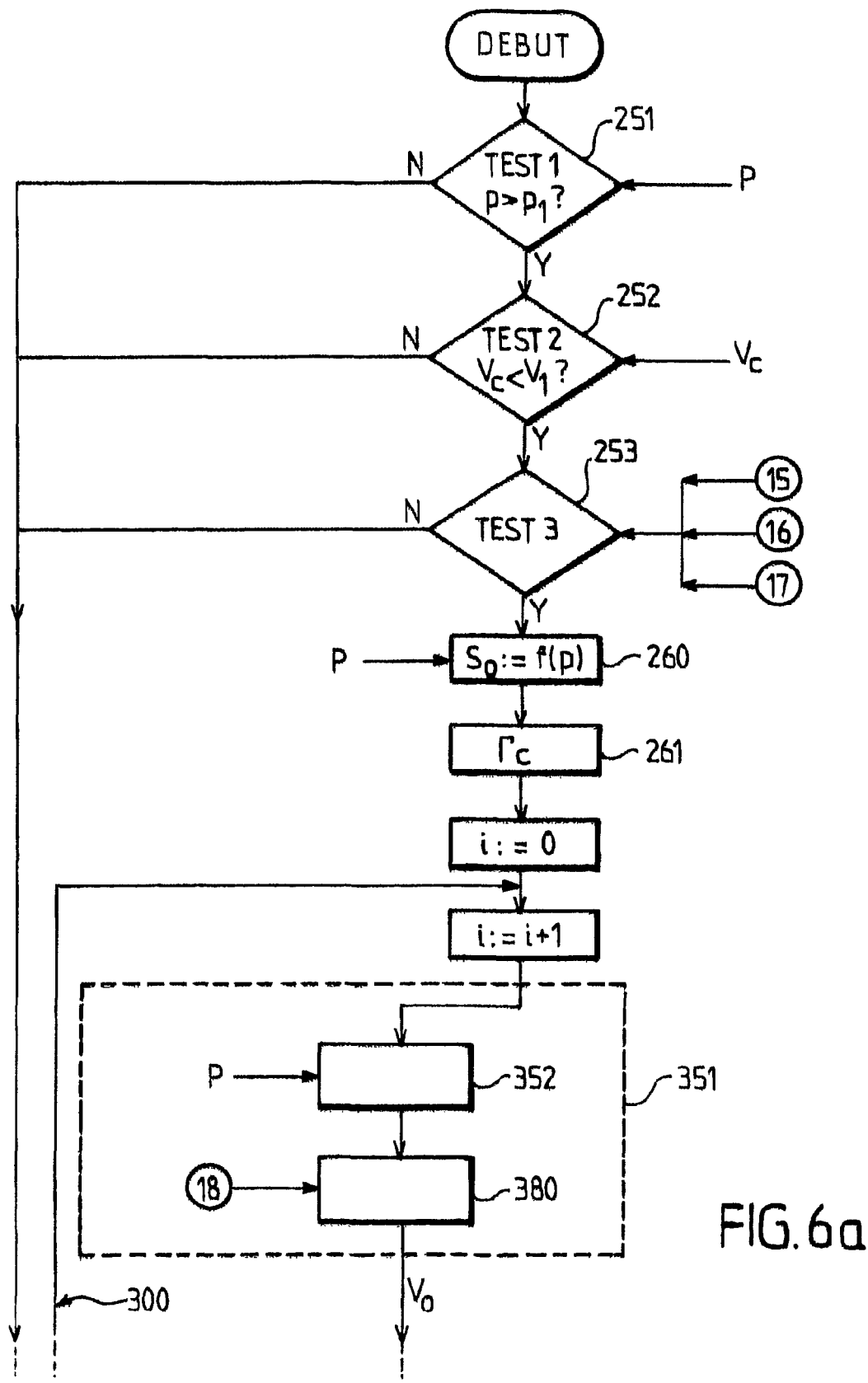
Figure 6B:
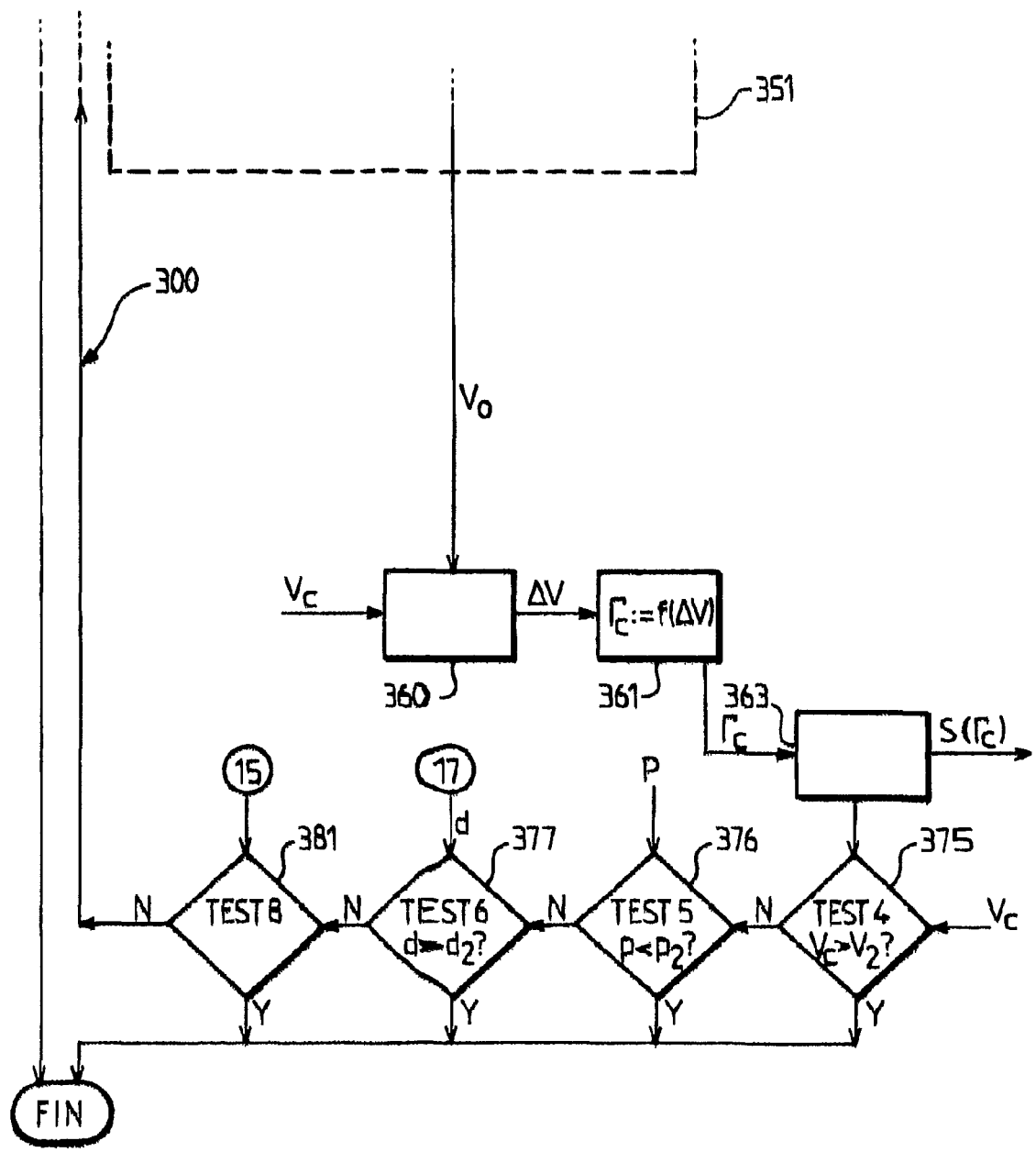

FIG. 3, combining FIGS. 3a and 3b, is a block diagram of a first embodiment of the process for assisting driving in accordance with the invention;

FIG. 4 is a graph showing different kinematic parameters of a vehicle provided with the driving assistance device of FIG. 1 engaged on a constant slope;

FIG. 5 is a graph showing different kinematic parameters of a vehicle provided with the assistance device engaged on a variable slope; and FIG. 6, combining FIGS. 6a and 6b, is a block diagram of a second embodiment of the process for assisting driving in accordance with the invention.

In what follows, the orientation of the vehicle along the slope is such that the descent is effected in reverse, i.e. the rear of the vehicle is directed towards the bottom of the slope, or the front of the vehicle is directed towards the top of the slope. The slope at a point in the road is defined by an angle p with the horizontal.

With reference to FIG. 1, the vehicle has four wheels, two front wheels 1 and 2 and two rear wheels 3 and 4. Each of the wheels is provided with a wheel velocity sensor 5 able to measure the instantaneous rotational velocity of the wheel in the proximity of which it is situated.

In the currently preferred embodiment, the braking system of the vehicle is a hybrid braking system: the front wheels 1 and 2 are respectively provided with hydraulic brakes 6 connected to an hydraulic actuator 12 via hydraulic connections 8; the rear wheels 3 and 4 are respectively provided with electromechanical brakes 7 provided with electromechanical actuators 9.

In the embodiment of FIG. 1, the device for assisting driving also includes a sensor of displacement or degree of depression of the brake pedal 16, a sensor of displacement or degree of depression of the accelerator pedal 17, a sensor of displacement of the clutch pedal 18 (or an equivalent such as a switch on the clutch pedal indicating the point of slip) and a sensor of the position of the lever of the gear-box 15.

The vehicle includes a sensor of longitudinal acceleration 19 of a type including an elastically suspended mass. The sensor 19 is able to emit a signal corresponding to the instantaneous value of a measured longitudinal acceleration $A_m$ of the vehicle.

The set of sensors described above and the hydraulic 12 and electromechanical 9 actuators communicate with an onboard calculator unit 11, through a communications bus 13. The communications bus 13 can, for example, support the CAN-Bus protocol.

The calculator unit 11 has all the electronic and software characteristics of a computer. In particular the calculator unit 11 includes a processor able to execute instructions in real time and a memory space in which are stored different series of instructions forming executable programs. The calculator unit 11 also includes input/output interfaces necessary for communication with the other elements of the device. These interfaces are able to receive and write in the memory space input data, such as measurements taken by the sensors, and to read from the memory space and transmit output data to the actuators.

The calculator unit 11 more particularly has the function of controlling the brake calipers. The calculator unit 11 for example executes a program for control of the behaviour of the vehicle, such as ABS (anti-lock control), ESP (stability control), or TCS (anti-skid control). The programmable calculator unit 11 is in particular able to execute the instruction codes of a program for assisting driving of a vehicle engaged on a slope for implementation of the process in accordance with the invention.

Figure 2:
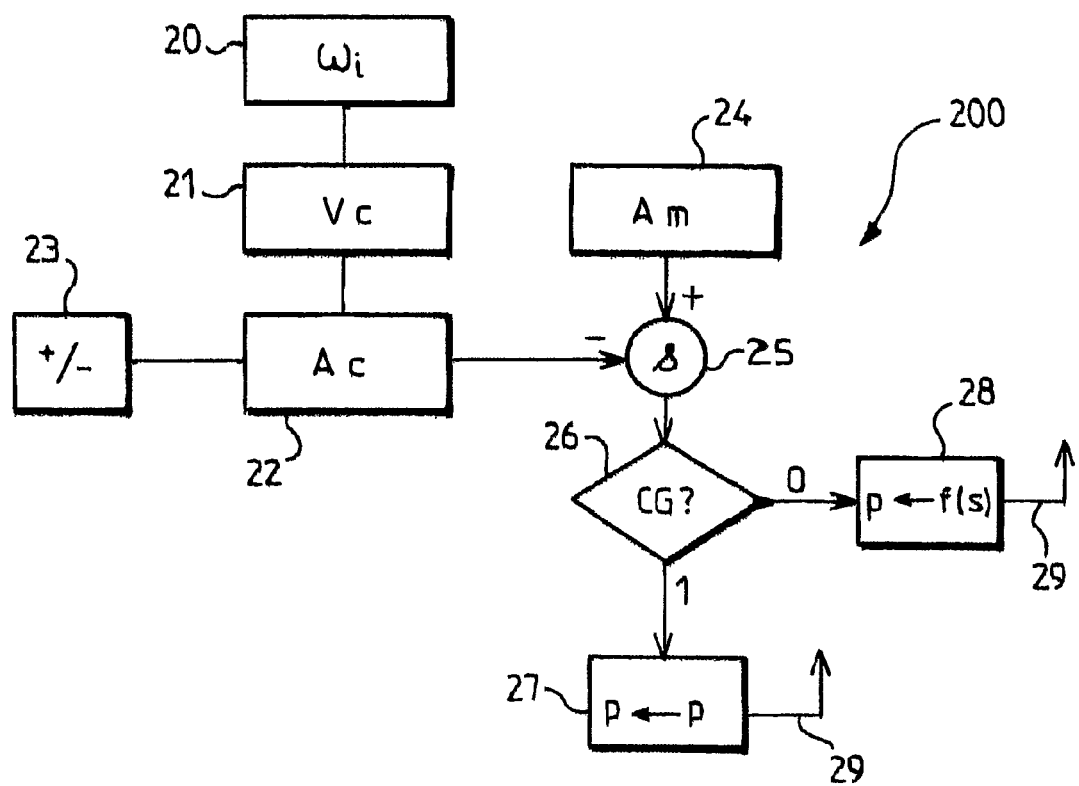
FIG. 2 is a block diagram showing the different steps permitting determination of the instantaneous value of the slope.

With reference to FIG. 2, a process 200 is described permitting estimation of the instantaneous value of the slope. This elementary process for determination of the slope constitutes a step of the process for assisting driving in accordance with the invention.

In step 20, acquisition is performed of the rotational velocities $\omega_i$ of each of the wheels measured by the different sensors 5.

In step 21, a velocity $V_c$ corresponding to the instantaneous velocity of the vehicle is calculated using the wheel velocities $\omega_i$. Different conventional processes well known to the man skilled in the art can be used to obtain this calculated velocity $V_c$.

In step 22, a calculated longitudinal acceleration $A_c$ corresponding to an instantaneous acceleration of the vehicle is calculated by temporal derivation of the calculated velocity $V_c$. When the wheel velocity sensors 5 are non-signed sensors, the information which they provide is in fact the absolute value of the wheel velocity $\omega_i$. In this case, the calculated velocity $V_c$, calculated in step 21, and the calculated longitudinal acceleration $A_c$, calculated in step 22, are absolute values. A step 23 is then provided to determine the sign to be given to the calculated longitudinal acceleration $A_c$, depending on the selected ratio of the gear-box. This information is given by the sensor 15 giving the position of the gear lever and by the sensor of the position of the clutch pedal 18 which tells whether the gear is clutched.

In step 23, if reverse gear is engaged and the clutch pedal is raised, the sign—is given to the calculated longitudinal acceleration $A_c$. If a forward gear is engaged and the clutch pedal is raised, the sign+is given to the calculated longitudinal acceleration $A_c$. If the gear-box is in neutral or the clutch pedal is depressed, there are two cases: either the vehicle was in motion at the preceding instant, in which case the sign is retained corresponding to the last gear which was engaged; or the vehicle was stationary at the preceding instant, in which case the acceleration sensor or accelerometer 19 is used to determine in which direction the vehicle is in the process of pulling away.

By way of modification, if the wheel velocity sensors 5 are signed sensors, step 23 is removed. In both embodiments, a calculated longitudinal acceleration $A_c$ is obtained which has an algebraic value, the sign of which corresponds to the direction of displacement of the vehicle.

In step 24, the instantaneous value of the longitudinal acceleration measured by the acceleration sensor 19 is acquired as the measured longitudinal acceleration $A_m$. This measurement $A_m$ is algebraic.

In step 25, a difference signal s is calculated: $s=A_m-A_c$.

In step 26, a logic condition CG is tested for freezing the slope measurements. In the example shown, the condition CG is a Boolean variable taking the value 0 when it is not verified and 1 when it is verified. To test the condition CG, the temporal derivative of the difference signal s is calculated: $D=ds/dt$. Many methods for derivation of a sampled signal are available to do this. The condition CG is:

$$CG=[|V_c|<S_1 \text{ or } (|V_c|\leq S_3 \text{ and } |D|>S_2)].$$

$S_1$ and $S_3$ are predetermined positive velocity thresholds. For example, $S_1$=1.5 km/h and $S_3$=5 km/h. $S_2$ is a fixed positive stability threshold which can be determined from tests.

By way of modification, when the vehicle is in motion, the rate of variation D can be calculated as spatial variation of the difference variable s: $D=(ds/dt)/V$.

If the freeze condition CG is not verified, step 28 is performed. A slope p estimation variable is updated as a function of the current value of the difference signal s: $p=\tan[\text{Arcsin}(s/g)]$, where g is the modulus of acceleration due to gravity.

Conversely, if the freeze condition CG is verified, step 27 is performed. The value of the estimation of slope obtained at the preceding iteration is retained as the current value of the slope.

After step 27 or 28, arrow 29 indicates the return to step 20 for a new iteration of the process for estimation of the slope p.

The estimated slope p is a precise estimation of the slope throughout a manoeuvre. Even if the momentary freezing of the measurement of the slope causes an error in the estimation, the estimated slope p can reliably be used to calculate different control variables. In particular, it is used by the calculator unit 11 to assist driving for the descent of a sloping road.

Of course, the slope p can be estimated by processes other than that described with reference to FIG. 2.

FIG. 3, arranged on two sheets for increased clarity, shows diagrammatically the succession of steps of the process for assisting driving in accordance with a first embodiment of the invention. This process is for example implemented by execution of a corresponding program stored in the memory space of the calculator unit 11.

The process starts with a plurality of verifications of entry conditions which, when effected simultaneously, permit re-entry into the main loop 100 for determination of the target braking torque.

In step 51, the first test Test1 consists of verifying whether the vehicle is engaged on a slope. In other words, the instantaneous value of the estimated slope p is compared with the value of a first threshold slope $p_1$. To pass to the next step, p must be greater than $p_1$. The first threshold slope $p_1$ is for example 5%.

In step 52, the second test Test2 consists of verifying whether the vehicle is stationary. This is effected by comparison of the calculated velocity $V_c$ with a lower threshold velocity $V_1$. To pass to the next step, $V_c$ must be less than $V_1$. In fact, $V_1$, is not selected as zero, as uncertainties due to the measurements performed by the sensors cause $V_c$ to fluctuate about zero while the vehicle is effectively stationary.

The third test Test3 (step 53) corresponds to detection of behaviour of the driver indicating an intention to pull away. The detected behaviour consists of engaging reverse gear, of releasing the brake pedal and of not pressing, or pressing very lightly, on the accelerator pedal. This information is given by the sensors 15, 16 and 17.

When all the entry conditions are satisfied, the program enters the main loop 100 for determination of a target braking torque $\Gamma_c$. If one of these entry conditions is not verified, the calculator unit 11 stops execution of the program. This will be executed again from the start a first predetermined time interval later, for example some tenths of a second later.

The iterations of the main loop are executed periodically at a second predetermined time interval, for example 10 ms. Each iteration of the main loop 100 is indexed by a whole number i.

The main loop starts with a step of determination of a desirable velocity $V_0$. In the course of this step 151, the velocity which seems to be desirable to descend the slope is determined. The value of the desirable velocity $V_0$ can be a pre-defined constant reference value, for example 3 kmh$^{-1}$.

Preferably, the value of the desirable velocity $V_0$ can depend on the instantaneous value of the slope p: the greater the slope, the smaller the desirable velocity $V_0$; the lesser the slope, the more the desirable velocity $V_0$ is increased. For example, in step 152 a corrective term is added to the constant reference value of 3 kmh$^{-1}$, the corrective term being proportional to the difference of the slope p from a reference slope $p_0$ for example of 5%.

In addition, in the currently preferred embodiment, the driver can directly influence the value of the desirable velocity $V_0$. If the driver displaces the accelerator pedal beyond a first degree of depression of the accelerator pedal $d_1$, while remaining within a second degree of depression $d_2$, this will be interpreted as the wish of the driver to increase the desirable velocity $V_0$. If, in step 152 the degree of depression d is detected within the range limited at the lower end by $d_1$ and at the upper end by $d_2$, the desirable velocity $V_0$ of the preceding iteration i-1 is increased by a predetermined value $\Delta V_0$ in step 154. The desirable velocity $V_0$ will therefore be progressively increased during a succession of iterations. If the degree of depression d is not within the interval [$d_1$, $d_2$], the value of $V_0$ calculated in step 152 is taken into account.

We then pass to the step of determination of a theoretical braking torque. The memory space 110 of the calculator unit 11 includes a plurality of calibration tables indexed by a velocity value. A calibration table gives the value of the braking torque to be applied to the wheels of the vehicle as a function of the slope p, for the vehicle, if the slope were constant, to effectively attain the velocity value used as index. Each of the calibration tables is obtained in the factory by performing tests on a vehicle characteristic of the range and then storing the results obtained in the memory space of the calculator unit of each of the vehicles.

In step 155, the calibration table of which the index corresponds to the current value of the desirable velocity $V_0$, determined on leaving step 151, is selected from the set of calibration tables present in the memory space 110.

Then, in step 156, the instantaneous value of the slope p allows reading from the selected calibration table of the value of the theoretical braking torque $\Gamma_{th}$.

In this embodiment, the value of the theoretical braking torque $\Gamma_{th}$ obtained in step 156 is not directly transmitted to the braking control system as the target value of the braking torque. In fact, the theoretical braking torque $\Gamma_{th}$ is the torque to be applied to keep the velocity of the vehicle at the desirable velocity $V_0$. However, the velocity of the vehicle, given by the calculated velocity $V_c$, can be less than the desirable velocity $V_0$ and it is therefore necessary to apply a target braking torque $\Gamma_c$ slightly smaller than the theoretical braking torque $\Gamma_{th}$ to increase the velocity $V_c$ of the vehicle. Conversely, if the velocity of the vehicle is greater than the desirable velocity $V_0$, it is necessary to apply a target braking torque $\Gamma_c$ slightly greater than the theoretical braking torque $\Gamma_{th}$ to reduce the velocity $V_c$ of the vehicle.

It therefore proves preferable to correct the theoretical braking torque $\Gamma_{th}$ using a correction torque $\Gamma_{corr}$ to obtain the target braking torque $\Gamma_c$. In the embodiment described, the correction torque $\Gamma_{corr}$ is an increasing function of the difference $\Delta V$ between the desirable velocity $V_0$ and the calculated velocity $V_c$.

In step 160, the difference $\Delta V$ is obtained by subtraction of the calculated velocity $V_c$ from the desirable velocity $V_0$ obtained on leaving step 151: $V=V_0-V_c$. It is to be noted that if $V_c$ is less than $V_0$, the sign of the difference $\Delta V$ is positive.

In step 161, the correction torque $\Gamma_{corr}$ is calculated. For example, $\Gamma_{corr}$ is proportional to the difference $\Delta V$ and to its temporal derivative.

In step 162, the target braking torque $\Gamma_c$ is obtained by subtraction of the correction torque $\Gamma_{corr}$ from the theoretical braking torque $\Gamma_{th}$. This current value of the target braking torque $\Gamma_c$ is transmitted in step 163 in the form for example of a signal $S(\Gamma_c)$ to the control system of the braking system of the vehicle, which is moreover of known type. The braking system then applies this braking torque, unless another function, for example a wheel anti-lock function, having higher priority, requires application of another braking torque.

If the difference $\Delta V$ is positive, the correction torque $\Gamma_{th}$ is smaller than the theoretical torque $\Gamma_{th}$ and the vehicle can assume more velocity on the slope.

Before looping the process for determination of the braking torque and starting a new iteration, different exit conditions are tested. If one of these exit conditions is verified, the execution of the program exits from the main loop 100 and is immediately terminated.

In step 175, the test Test4 consists of comparing the value of the calculated velocity $V_c$ with an upper threshold velocity $V_2$ for example 20 kmh$^{-1}$. In fact, if the driver presses continuously on the accelerator pedal, the desirable velocity $V_0$ increases and consequently the velocity of descent of the slope also increases. It is not necessary to continue execution of the program for assisting driving if the calculated velocity $V_c$ is greater than the upper threshold velocity $V_2$.

In step 176, the test Test5 consists of comparing the value of the slope p with a second predetermined slope $p_2$. If the vehicle has arrived at the bottom of the slope, which is characterised by a virtually zero slope, it is not necessary to continue execution of the program for assisting driving. The value of the second predetermined slope $p_2$ is small to take into account errors in the calculated value of the slope p.

It is also desirable to add an exit condition Test6 for the operation of the accelerator pedal. If the driver presses on the accelerator pedal in such a manner that the sensor 17 detects a large displacement, greater than the second degree of depression $d_2$, this signifies that the driver wishes to retain control and himself control the descent of the slope. This condition is tested in step 177.

An exit condition Test7 for the brake pedal is tested in step 178. If the driver presses on the brake pedal in such a manner as to produce a braking force greater than that recommended by the program for assisting driving, i.e. the target braking torque $\Gamma_c$, the driver wishes to resume control and stop the vehicle again. If this exit condition is verified in step 178, execution of the program is exited, otherwise a new iteration of the main loop 100 is executed.

The applicant has performed tests on the kinematic behaviour of a vehicle provided with the device for assisting downhill driving.

FIG. 4 shows several graphs which correspond to real kinematic parameters of a vehicle engaged on a substantially constant 24% slope: the curve C1 represents the temporal evolution of the value of the slope p determined in accordance with the process shown in FIG. 2. In this simulation, the device for assisting driving is active from the instant t=0 and remains so during the whole simulation. It is supposed that the driver does not operate the accelerator pedal. Consequently, the desirable velocity $V_0$ is constant during the simulation (curve C2).

The curve C3 shows the variations in the target braking torque $\Gamma_c$. At the start of the test, the target braking torque decreases. In the embodiment of the assistance function in accordance with the invention, the entry condition Test1 is that the vehicle is initially stationary. The assistance function can then by way of modification include an initial procedure permitting the progressive release of the brakes. Consequently, the vehicle, driven on the slope by its weight, acquires velocity.

Before the instant $t_0$, the torque required by this release procedure, although decreasing over time, still remains greater than the target braking torque calculated by the assistance device.

At the instant $t_0$, the target braking torque required by the assistance device becomes greater than the braking torque required by the initial procedure. From this instant, the assistance device takes over the braking. It is then a question of controlling the vehicle for the calculated velocity $V_c$ represented by the curve C5, to tend asymptotically towards the desirable velocity $V_0$. When this velocity has effectively been attained, for example at $t_1$, the braking torque to be applied to maintain this velocity is constant and corresponds substantially to the theoretical braking torque $\Gamma_{th}$. In FIG. 4, the curve C4 represents the temporal evolution of the braking torque effectively applied to the rear wheels of the vehicle and measured by braking force sensors arranged on the electromechanical calipers. Between the instants $t_0$ and $t_1$, the transition corresponds to a large correction of the theoretical braking torque $\Gamma_{th}$, as the difference between the desirable velocity $V_0$ and the calculated velocity $V_c$ is large. The target braking torque $\Gamma_c$ increases progressively with the velocity. Thus, the driver feels no jolting of the braking system.

In FIG. 5, in a test during which the vehicle descends a road with a varying slope, the temporal evolution has been shown of the measured slope p (curve B1), of the target braking torque $\Gamma_c$ (curve B2) and of the calculated velocity $V_c$ of the vehicle (curve B3). The curves of FIG. 5 are difficult to interpret, since the slope p evolves continuously, which causes a continual modification of the desirable velocity $V_0$. What must be noted is that the evaluation of the slope p at a given instant is immediately taken into account in calculation of the target braking torque to be applied. The advantage of the process in accordance with this embodiment of the invention resides in this immediate response of the assistance device to the information regarding the slope. There is no waiting for the effects of the slope on the velocity of the vehicle to make themselves felt, i.e. an increase in the calculated velocity $V_c$, to reduce the velocity by braking. The braking necessary to keep the vehicle at a constant velocity (curve B3) is anticipated.

The phenomena of oscillation of the velocity, due to adjustment of the velocity variable itself, no longer exist here. The comfort, actual safety but also the safety perceived by the driver are therefore substantially improved by implementation of the assistance process in accordance with the invention.

FIG. 6, arranged on two sheets for greater clarity, shows diagrammatically the sequence of steps of the process for assisting driving in accordance with a second embodiment of the invention. This process is for example implemented by execution of a corresponding program stored in the memory space of the calculator unit 11. Elements identical or similar to elements of the first embodiment are designated by the same reference numbers, increased by 200.

The process starts with the steps 251, 252 and 253 of verification of entry conditions, for example identical to steps 51, 52 and 53 respectively. Preferably, as a modification, the vehicle includes a hill hold function and, in step 252, the test Test2 consisting of verifying whether the vehicle is stationary is performed by verifying that this hill hold function is active.

When all the entry conditions are satisfied, the program enters an initial procedure of progressive release of the brakes. During the initial procedure, the program calculates a target braking torque $\Gamma_c$ in accordance with different modalities of the main loop and transmits a corresponding signal to the braking control system.

The initial procedure of progressive release of the brakes permits passage from a stationary torque, which in this example is the torque applied by the hill hold function to keep the vehicle immobile, to a lesser torque allowing the vehicle to assume velocity in a controlled manner. The progressive reduction of the target braking torque permits prevention of jolting on pulling away and prevention of too large an adoption of velocity. The hill hold functions are moreover known. The stationary torque is generally determined as a function of the slope and the mass of the vehicle and with a safety coefficient guaranteeing firm immobilisation of the vehicle. In accordance with another modification, the stationary torque is the torque applied by the parking brake and the entry condition Test3 is only verified if the parking brake is released.

The initial procedure proceeds for example as described with reference to steps 260 and 261. In step 260, the program determines a theoretical torque $S_0$. The theoretical torque $S_0$ is a function of the slope, for example a linear function equal to 60% of the stationary torque for a steep slope and 30% for a gentle slope. Preferably, the theoretical torque S0 substantially corresponds, for a given slope, to the braking torque having to be applied to keep the velocity of the vehicle constant, i.e. to compensate for the slope.

Then, in step 261, the initial procedure continues in three phases. Firstly, the target torque $\Gamma_c$, starting from the stationary torque, is rapidly reduced until it reaches the value $S_0$. This rapid reduction is performed at a first rate of temporal variation $\tau_1$, for example −900 Nm/s, and allows a lesser torque to be rapidly attained. Secondly, the target torque $\Gamma_c$ continues to be reduced, but this time less rapidly, at a second rate of temporal variation $\tau_2$ equal for example to −200 Nm/s. As, after the first phase, a level of braking torque has been attained or approached at which the vehicle is no longer held on the slope but, on the contrary, pulls away, the second phase of slow reduction permits pulling away without jolting. This second phase continues until the vehicle has attained sufficient velocity, which is tested by verifying that the calculated velocity $V_c$ is greater than a given velocity threshold. In accordance with a particular embodiment, the velocity threshold is a detection threshold intended to detect the first displacement of the vehicle. For this purpose, the velocity threshold is located just above the margin of error of the wheel velocity sensors. Then, at the third phase, the target torque $\Gamma_c$ is progressively increased, at a third rate of temporal variation $\tau_3$ equal, for example, except for the sign, to the second rate of temporal variation $\tau_2$. In accordance with another example, the rate $\tau_3$ is equal to +50 Nm/s. This third phase continues until the target braking torque $\Gamma_c$ again reaches the theoretical torque $S_0$. The initial procedure is then terminated.

Then, the program enters the main loop 300 for determination of a target braking torque $\Gamma_c$.

The main loop starts with a step 351 of determination of a desirable velocity $V_0$. The step 351 can be identical to the step 151. Alternatively, as shown in FIG. 6a, the step 351 comprises a step 352 of determination of the desirable velocity $V_0$ as a function of the instantaneous value of the slope p. The step 352 is for example identical to the step 152. In accordance with another example, the desirable velocity $V_0$ depends linearly on the slope p and equals 2.8 km/h for a 10% slope and 2.2 km/h for a 30% slope.

Then, the program passes to the step 380 in which the desirable velocity determined in step 352 is optionally modified, as a function of the position of the clutch pedal detected by the sensor 18. More precisely, if in step 380 the sensor 18 indicates that the clutch pedal is released, the value determined in step 352 is increased, for example by a determined constant value of 5.5 km/h. In the contrary case, the value determined in step 352 is not modified. Preferably, an additional condition for this velocity increase is that the sensor 15 indicates that reverse gear is engaged. In fact, if the gear lever is in the neutral position, the risk of stalling the engine as explained below is zero and it is not therefore necessary to increase the velocity.

The step 380 has two advantages. Firstly, it allows the driver to easily control the descent velocity, by depressing or releasing the clutch pedal. Secondly, if the clutch is released while the braking system is applying a braking torque, the increase in the desirable velocity permits prevention of the engine stalling. In fact, an increase in the desirable velocity results in a reduction in the braking torque to be applied. This reduction therefore compensates for the increase in the engine load resulting from release of the clutch pedal.

Step 351 could also comprise a step of determination of the desirable velocity as a function of the position of the accelerator pedal, in similar manner to steps 153 and 154. In addition, step 351 can be used in the first embodiment in place of the step 151. The methods of adjustment of the desirable velocity by means of the accelerator pedal and the clutch pedal can also be concurrent.

The program then passes to the step 360 and determines a difference $\Delta V$ between the instantaneous value of the desirable velocity $V_0$ and the instantaneous value of a calculated velocity $V_c$.

In this embodiment, preferably the velocity $V_c$ does not correspond to the mean velocity of the vehicle, but to the velocity of one of the wheels of the vehicle, and, in this case, the determined target braking torque $\Gamma_c$ is the torque to be applied to this wheel. In this case, for example, a plurality of instances of the program is executed in parallel, for at least two wheels, preferably the rear wheels, and optionally for the four wheels. In accordance with another example, only steps 360, 361 and 363 are performed a plurality of times in parallel for two or four wheels, the other steps being performed in common for the different wheels. Such individual determination of the target braking torque for at least two wheels increases the precision of velocity control and improves comfort. Of course, such individual determination is also applicable in the first embodiment, and conversely overall determination is applicable in the second embodiment.

In step 361, the target braking torque is determined as a function of the difference in velocity $\Delta V$, for example following proportional and derivative (PD) or proportional, integral and derivative (PID) adjustment, so that, by retroactive effect, the velocity $V_c$ is equal to the desirable velocity $V_0$, or in other words so that $\Delta V$ tends towards a zero value. The PD or PID adjustment is such that there is no discontinuity in the value of the target braking torque $\Gamma_c$, i.e. no sharp variation, either at the successive iterations of the main loop 300, or at the transition between the initial procedure and the main loop 300.

In the case in which individual determination of the target braking force is performed for the four wheels, the control gains of this PD or PID adjustment can be different for the front and rear wheels.

Then, in step 363, the value of the target braking torque $\Gamma_c$ is transmitted for example in the form of a signal $S(\Gamma_c)$ to the control system of the braking system of the vehicle, which is moreover known.

The program continues with verification of the exit conditions, in accordance with steps 375, 376 and 377, identical to steps 175, 176 and 177 respectively. Preferably, the program in accordance with the second embodiment does not include the step corresponding to the step 178, which is also optional in the first embodiment. Thus, if the driver brakes so as to apply a braking torque greater than the target braking torque and then releases the brake pedal, the braking torque will still be under the control of the assistance process and the driver will not be surprised by an increase in velocity.

In the second embodiment, an additional exit condition Test8 of the position of the gear lever is tested in step 381. This step could also be present in the first embodiment. If the driver has engaged a forward gear, which is detected by the sensor 15, it is that the driver wishes to regain control and stop the vehicle. If in step 381 this condition is verified, execution of the program is exited, to pass for example to execution of a hill hold program.

As explained above, the target braking torque can be determined individually for two or four wheels. Preferably, the choice of adjustment at two or four wheels is performed as described below.

If the slope p is greater than a determined threshold, for example 20%, the target braking torque is determined individually for the four wheels.

If the velocity difference $\Delta V$ is greater than a given threshold for a period greater than a given period, the target braking torque is determined individually for the four wheels.

In the contrary case, the target braking torque is determined individually for the two rear wheels, and the target braking torque for the two front wheels is zero.

A program module is executed in parallel with the program (s) for determination of a target braking torque, tests the above conditions and controls the determination and application of a target braking torque for two or four wheels. Of course, multiplicative distribution coefficients are applied to the determined target braking torques, as a function of application to two or four wheels, so that the total torque applied corresponds to the desirable velocity.

The assistance process in accordance with the invention greatly facilitates driving of the vehicle, notably when manoeuvring on a slope at low velocity, for example in parking manoeuvres. It is possible to control the vehicle with only two pedals, the accelerator pedal and the clutch pedal in the case of a vehicle with manual transmission.

This process is advantageously combined with a hill hold function. For example, when the process is terminated because the condition Test8 is verified, a hill hold function can be activated, while if the process is terminated because one of the other exit conditions is verified, the vehicle can continue its displacement. Thus, it is possible to stop the vehicle easily on a slope.

Tests with a device for assisting driving implementing the process in accordance with the second embodiment have given similar results, in terms of comfort, to those in FIGS. 4 and 5.

In another modification of the process in accordance with the invention, assistance on descent of a slope is used when the orientation of the vehicle is such that the front of the vehicle is directed towards the bottom of the slope. To activate the assistance mode, it is then necessary to test (Test3) whether first gear is engaged. In this case, in step 381 the test Test8 is verified if the driver engages reverse gear. The assistance process is advantageously implemented in a vehicle having a hybrid braking system, so that the target braking torque calculated by the assistance process is specifically applied only to the rear wheels. In this manner, use is made of the particular characteristics of the electromechanical calipers and in particular their silent actuation.

Although the invention has been described with reference to several particular embodiments, it is quite obvious that it is in no way limited to these and that it includes all the technical equivalents of the means described and their combinations if these fall within the scope of the invention.

The invention claimed is:

1. Process for assisting driving of a vehicle engaged on a slope, the said vehicle including:
   a braking system uncoupled from the operation of a brake pedal by the driver of the vehicle and able to apply a braking torque to at least one wheel of the said vehicle;
   at least one wheel velocity sensor (5) able to measure an instantaneous velocity of a wheel of the said vehicle;
the process including the steps consisting of:
   determining the instantaneous value of the slope on which the said vehicle is located;
   testing the initial simultaneous existence of initial conditions including at least one entry condition; and, once the said initial conditions are all verified and while at least one exit condition (175-178; 375-377, 380) is not verified, performing successive iterations of a main loop (100, 300) for determination of a target braking torque ($\Gamma_c$) consisting of:
      defining a desirable velocity ($V_0$) having to be attained by the vehicle;
      determining the said target braking torque ($\Gamma_c$) as a function of a difference ($\Delta V$) between the instantaneous value of the said desirable velocity ($V_0$) and the instantaneous value of a calculated velocity ($V_c$), calculated from measurements performed by the said at least one wheel sensor (5); and,
   transmitting (163, 363) a signal corresponding to the value of the said target braking torque ($\Gamma_c$) to a braking control system forming part of the braking system;
characterised by the fact that the said initial conditions include an entry condition verified when the vehicle is stationary (52, 252) and by the fact that from the moment at which the said initial conditions are all verified and until an exit condition from the initial procedure is verified, the said target braking torque is determined by an initial procedure of progressive release of the brakes (260, 261) comprising the step consisting of temporally reducing the said target braking torque from an initial stationary value, the said exit condition from the initial procedure depending on a comparison between the said target braking torque ($\Gamma_c$) and a theoretical braking torque ($\Gamma_{th}$, $S_0$) which is a function of the value of the slope (p) characterized by the fact that the said initial procedure comprises the steps consisting of:
   reducing the said target braking torque ($\Gamma_c$) until the said calculated velocity ($V_c$) is greater than a predetermined threshold velocity,
   increasing the said target braking torque ($\Gamma_c$) until the said exit condition from the initial procedure is verified, the said exit condition from the initial procedure being verified when the said target braking torque ($\Gamma_c$) is greater than the said theoretical braking torque ($S_0$).

2. Process as described in claim 1, characterised by the fact that the said theoretical braking torque ($S_0$) is substantially equal to the torque to be applied to the said at least one wheel of the vehicle to keep the velocity of the vehicle constant.

3. Process as described in claim 1, characterised by the fact that the step of reduction of the target braking torque is firstly performed at a first rate of temporal variation ($\tau_1$) until the said target braking torque is less than the said theoretical braking torque ($S_0$), and then at a second rate of temporal variation ($\tau_2$) until the said calculated velocity ($V_c$) is greater than a predetermined velocity threshold, the said first rate of temporal variation being greater than the said second rate of temporal variation.

4. Process as described in claim 1, characterised by the fact that the step of increasing the target braking torque is performed at a third rate of temporal variation ($\tau_3$).

5. Process as described in claim 1, characterised by the fact that when the said initial conditions are all verified, the process includes the said initial procedure of progressive release of the brakes performed in parallel with the said main loop (100), the said exit condition from the initial procedure being verified when the target braking torque ($\Gamma_c$) determined by the said main loop is greater than the target braking torque ($\Gamma_c$) determined by the said initial procedure.

6. Process as described in claim 1, characterised by the fact that the process includes a step consisting, at each iteration of the said main loop (100, 300), of determining the said desirable descent velocity ($V_0$) as a function of the determined instantaneous value of the slope (p).

7. Process as described in claim 1, the said vehicle including an accelerator pedal and an acceleration sensor (17) able to measure the degree of depression of the said accelerator pedal by the driver, characterised by the fact that, at each iteration, the said desirable velocity ($V_0$) is determined as a function of the instantaneous value of the degree of depression of the pedal (d), provided that the said instantaneous value of the degree of depression of the accelerator pedal is within a range limited at the lower end by a first predetermined degree of depression of the accelerator pedal ($d_1$) and at the upper end by a second predetermined degree of depression of the accelerator pedal ($d_2$).

8. Process as described in claim 7, characterised by the fact that at each iteration, the said desirable velocity ($V_0$) is increased by a predetermined value ($\Delta V_0$) relative to the desirable velocity determined at the preceding iteration, provided that the said instantaneous value of the degree of depression of the accelerator pedal is within the said range.

9. Process as described in claim 1, the said vehicle including a clutch pedal and a sensor of displacement of the clutch pedal (18), characterised by the fact that the said step consisting of determining the said desirable velocity comprises the step consisting of adding a determined value when the said sensor of displacement of the clutch pedal (18) indicates that the said clutch pedal is released.

10. Process as described in claim 1, characterised by the fact that the said theoretical braking torque ($\Gamma_{th}$) is determined from a calibration table giving the value of the braking torque as a function of the slope (p).

11. Process as described in claim 1, characterised by the fact that the said initial conditions include an entry condition which consists of comparing (51, 251) an instantaneous value of the said slope (p) relative to a predetermined first threshold slope ($p_1$), the said entry condition being verified when the said instantaneous value of the said slope is greater than the said first threshold slope.

12. Process as described in claim 1, characterised by the fact that the said at least one exit condition consists of comparing (176, 376) an instantaneous value of the said slope (p) with a second predetermined slope ($p_2$), the exit condition being verified when the said instantaneous value of the slope is less than the said second predetermined slope.

13. Process as described in claim 1, characterised by the fact that the said at least one exit condition consists of comparing (175, 375) an instantaneous velocity ($V_c$), calculated from measurements performed by the said at least one wheel velocity sensor (5), with an upper threshold velocity ($V_2$), the said exit condition being verified when the said instantaneous velocity is greater than an upper threshold velocity.

14. Process as described in claim 3, characterised by the fact that the said successive iterations of the said main loop (100) comprise the steps consisting of:
- determining (156) a theoretical braking torque ($\Gamma_{th}$) for the vehicle to attain a desirable velocity ($V_0$);
- correcting (162) the value of the said theoretical braking torque as a function of the said velocity difference to obtain the said target braking torque ($\Gamma_c$).

15. Process as described in claim 1, characterised by the fact that the said vehicle includes an accelerometer (19) able to measure a longitudinal acceleration of the body of the said vehicle as the measured longitudinal acceleration ($A_m$), the said instantaneous value of the slope being determined by:
- calculating an instantaneous longitudinal acceleration ($A_c$) from wheel velocity measurements taken by the said at least one wheel velocity sensor;
- determining a slope (p) by comparison of the said instantaneous longitudinal acceleration with the said longitudinal acceleration measured by the said accelerometer.

16. Programmable calculator unit (11) including a processor and at least a memory space (110), the said memory space including instruction codes of a program for assisting driving of a vehicle engaged on a slope, characterised by the fact that the said program for assisting driving implements a process for assisting driving as described in claim 1.

17. Device for assisting the driving of a vehicle engaged on a slope, including:
- a braking system uncoupled from the operation by the driver of a brake pedal;
- at least one wheel velocity sensor (5) able to measure the instantaneous velocity of a wheel of the said vehicle;
- an accelerometer (19) able to measure a longitudinal acceleration of the body of the said vehicle as the measured longitudinal acceleration ($A_m$);
- a programmable calculator unit (11); characterised by the fact that the said programmable calculator unit is a calculator unit as described in claim 16.

\* \* \* \* \*